United States Patent
Hunt, IV

(10) Patent No.: US 12,034,703 B2
(45) Date of Patent: *Jul. 9, 2024

(54) DYNAMIC, USER-CONFIGURABLE VIRTUAL PRIVATE NETWORK

(71) Applicant: Conceal, Inc., Chantilly, VA (US)

(72) Inventor: Ira A. Hunt, IV, Chantilly, VA (US)

(73) Assignee: Conceal, Inc., Chantilly, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,917

(22) Filed: Apr. 17, 2023

(65) Prior Publication Data
US 2024/0022544 A1  Jan. 18, 2024

Related U.S. Application Data

(60) Continuation of application No. 17/314,796, filed on May 7, 2021, now Pat. No. 11,652,798, which is a
(Continued)

(51) Int. Cl.
*H04L 9/40* (2022.01)
*H04L 12/46* (2006.01)
(Continued)

(52) U.S. Cl.
CPC ...... *H04L 63/0272* (2013.01); *H04L 12/4641* (2013.01); *H04L 45/22* (2013.01);
(Continued)

(58) Field of Classification Search
CPC . H04L 63/0272; H04L 12/4641; H04L 45/22; H04L 63/0414; H04L 63/06;
(Continued)

(56) References Cited

U.S. PATENT DOCUMENTS

| 5,010,553 A | 4/1991 | Scheller et al. |
| 5,802,311 A | 9/1998 | Wronski |

(Continued)

FOREIGN PATENT DOCUMENTS

| CN | 101873255 A | 10/2010 |
| CN | 110677426 B | 11/2021 |

(Continued)

OTHER PUBLICATIONS

Extended European Search Report received for European Application No. EP18194360.6, dated Feb. 27, 2019, 14 pages.
(Continued)

*Primary Examiner* — John B King
(74) *Attorney, Agent, or Firm* — COOLEY LLP

(57) ABSTRACT

Some embodiments described herein relate managing communications between an origin and a destination using end-user and/or administrator configurable virtual private network(s) (VPN(s)). A first VPN that defines a first data path between an origin and a destination can be defined at a first time. A second VPN that defines a second, different data path between the origin and the destination can defined at a second time. Each packet sent across the first VPN and each packet sent across the second VPN can follow the same data path for that VPN, such each packet can be sent across the first VPN or the second VPN in the order it was received, and the transition between the first VPN and the second VPN can be "seamless," and communications between the origin and the destination are not disrupted between the first time period and the second time period.

20 Claims, 7 Drawing Sheets

Related U.S. Application Data continuation of application No. 16/721,445, filed on Dec. 19, 2019, now Pat. No. 11,005,818, which is a division of application No. 15/864,781, filed on Jan. 8, 2018, now Pat. No. 10,516,650.

(60) Provisional application No. 62/558,204, filed on Sep. 13, 2017.

(51) Int. Cl.
*H04L 45/00* (2022.01)
*H04L 49/00* (2022.01)

(52) U.S. Cl.
CPC .......... *H04L 63/0414* (2013.01); *H04L 63/06* (2013.01); *H04L 63/0823* (2013.01); *H04L 63/083* (2013.01); *H04L 12/4633* (2013.01); *H04L 45/54* (2013.01); *H04L 49/70* (2013.01)

(58) Field of Classification Search
CPC ............... H04L 63/0823; H04L 63/083; H04L 12/4633; H04L 45/54; H04L 49/70; H04L 9/40; H04L 12/46; H04L 65/40
See application file for complete search history.

(56) References Cited

U.S. PATENT DOCUMENTS

| | | | |
|---|---|---|---|
| 5,909,437 A | 6/1999 | Rhodes et al. | |
| 6,266,704 B1 | 7/2001 | Reed et al. | |
| 7,155,518 B2 | 12/2006 | Forslow | |
| 7,310,730 B1 * | 12/2007 | Champagne | H04L 63/0428 713/153 |
| 8,832,311 B1 | 9/2014 | Reynolds et al. | |
| 8,984,138 B2 | 3/2015 | Hunt | |
| 9,237,188 B1 * | 1/2016 | Gabrielson | H04N 21/4437 |
| 9,417,922 B2 | 8/2016 | Hunt | |
| 9,860,342 B2 | 1/2018 | Hunt | |
| 10,228,959 B1 | 3/2019 | Anderson et al. | |
| 10,516,650 B2 | 12/2019 | Hunt, IV | |
| 10,798,217 B2 | 10/2020 | Hunt | |
| 11,005,818 B2 | 5/2021 | Hunt, IV | |
| 11,272,037 B2 | 3/2022 | Hunt | |
| 11,652,798 B2 | 5/2023 | Hunt, IV | |
| 11,683,386 B2 | 6/2023 | Hunt | |
| 2002/0023210 A1 | 2/2002 | Tuomenoksa et al. | |
| 2002/0161884 A1 | 10/2002 | Munger et al. | |
| 2002/0161925 A1 * | 10/2002 | Munger | H04L 63/1491 709/241 |
| 2004/0174879 A1 | 9/2004 | Basso et al. | |
| 2005/0122979 A1 * | 6/2005 | Gross | H04L 63/20 370/395.2 |
| 2005/0220072 A1 | 10/2005 | Boustead et al. | |
| 2006/0059370 A1 | 3/2006 | Asnis et al. | |
| 2007/0130366 A1 | 6/2007 | O'Connell et al. | |
| 2009/0031042 A1 | 1/2009 | Phatak | |
| 2010/0027552 A1 | 2/2010 | Hill | |
| 2010/0043068 A1 | 2/2010 | Varadhan et al. | |
| 2011/0075667 A1 | 3/2011 | Li et al. | |
| 2012/0201123 A1 * | 8/2012 | Pegrum | H04L 49/25 370/355 |
| 2012/0221696 A1 | 8/2012 | Ferris | |
| 2012/0278804 A1 | 11/2012 | Narayanasamy et al. | |
| 2012/0303739 A1 | 11/2012 | Ferris | |
| 2013/0044764 A1 | 2/2013 | Casado et al. | |
| 2013/0086236 A1 | 4/2013 | Baucke et al. | |
| 2013/0132532 A1 | 5/2013 | Zhang et al. | |
| 2013/0152161 A1 | 6/2013 | Onno et al. | |
| 2013/0182651 A1 | 7/2013 | Kelkar et al. | |
| 2013/0263125 A1 | 10/2013 | Shamsee et al. | |
| 2013/0311988 A1 | 11/2013 | Boss et al. | |
| 2013/0322446 A1 | 12/2013 | Biswas et al. | |
| 2013/0326081 A1 * | 12/2013 | Katz | H04L 63/0272 709/231 |
| 2014/0098815 A1 | 4/2014 | Mishra et al. | |
| 2014/0119375 A1 | 5/2014 | Tseng et al. | |
| 2014/0156818 A1 | 6/2014 | Hunt | |
| 2014/0164774 A1 | 6/2014 | Nord et al. | |
| 2014/0223170 A1 | 8/2014 | Reynolds et al. | |
| 2014/0298446 A1 * | 10/2014 | Grand | H04L 45/302 726/15 |
| 2015/0172156 A1 | 6/2015 | Lohiya et al. | |
| 2015/0188823 A1 | 7/2015 | Williams et al. | |
| 2015/0288719 A1 | 10/2015 | Freudiger et al. | |
| 2016/0371508 A1 | 12/2016 | McCorkendale et al. | |
| 2017/0019335 A1 | 1/2017 | Schultz et al. | |
| 2017/0171154 A1 | 6/2017 | Brown et al. | |
| 2018/0123804 A1 | 5/2018 | Smith et al. | |
| 2018/0375685 A1 * | 12/2018 | Zhuang | H04L 12/4633 |
| 2018/0375963 A1 | 12/2018 | Hunt | |
| 2019/0081930 A1 | 3/2019 | Hunt, IV | |
| 2020/0127977 A1 | 4/2020 | Hunt, IV | |
| 2021/0243276 A1 | 8/2021 | Hunt | |
| 2022/0078164 A1 | 3/2022 | Hunt, IV | |
| 2022/0368771 A1 | 11/2022 | Hunt | |

FOREIGN PATENT DOCUMENTS

| | | |
|---|---|---|
| CN | 114358118 A | 4/2022 |
| WO | WO-2014089052 A1 | 6/2014 |

OTHER PUBLICATIONS

Final Office Action received for U.S. Appl. No. 13/961,379, dated Dec. 30, 2015, 6 pages.
Final Office Action received for U.S. Appl. No. 15/237,271, dated Aug. 10, 2017, 6 pages.
Final Office Action received for U.S. Appl. No. 15/864,781 dated Mar. 6, 2019, 26 pages.
International Search Report and Written Opinion dated May 13, 2014, in corresponding PCT Application No. PCT/US2013/072836, 8 pgs.
Non-Final Office Action for U.S. Appl. No. 17/688,373 dated Oct. 14, 2022, 10 pages.
Non-Final Office Action for U.S. Appl. No. 18/313,881 dated Dec. 18, 2023, 19 pages.
Non-Final Office Action received for U.S. Appl. No. 13/961,379, dated Aug. 27, 2015, 13 pages.
Non-Final Office Action received for U.S. Appl. No. 14/036,731, dated Dec. 31, 2013, 11 pages.
Non-Final Office Action received for U.S. Appl. No. 14/036,731, dated Jun. 2, 2014, 6 pages.
Non-Final Office Action received for U.S. Appl. No. 15/237,271, dated Mar. 13, 2017, 16 pages.
Non-Final Office Action received for U.S. Appl. No. 15/864,781, dated Oct. 18, 2018, 24 pages.
Notice of Allowance for U.S. Appl. No. 17/314,796 dated Jan. 11, 2023, 11 pages.
Notice of Allowance for U.S. Appl. No. 17/688,373, dated Feb. 6, 2023, 8 pages.
Partial European Search Report received for European Application No. EP18194360.6, dated Nov. 22, 2018, 17 pages.

* cited by examiner

DYNAMIC, USER-CONFIGURABLE VIRTUAL PRIVATE NETWORK

CROSS REFERENCE TO RELATED APPLICATIONS

This application is a continuation of U.S. patent application Ser. No. 17/314,796, filed May 7, 2021, which is a continuation of U.S. patent application Ser. No. 16/721,445, filed Dec. 19, 2019, which is a divisional of U.S. patent application Ser. No. 15/864,781, filed Jan. 8, 2018, which is a non-provisional of and claims priority to U.S. Patent Application No. 62/558,204, filed Sep. 13, 2017, each of which is hereby incorporated by reference in its entirety.

This application is related to U.S. Pat. No. 8,984,138, issued Mar. 17, 2015; U.S. Pat. No. 9,417,922, issued Aug. 16, 2016; U.S. patent application Ser. No. 15/237,271, filed Aug. 15, 2016; and U.S. Provisional Application No. 61/732,664, filed Dec. 3, 2012; each of which is entitled "Systems and Methods for Protecting an Identity in Network Communications," and each of which is hereby incorporated by reference in its entirety.

BACKGROUND

The present application generally relates to dynamic virtual private network (VPN) routing. Embodiments described herein are capable of providing carrier grade performance and low latency. Some embodiments described herein relate to a dynamically routed software defined network (SDN) that can provide true end-to-end obfuscation of both user traffic and user peering information.

Known VPNs can define a secure point-to-point tunnel between two compute devices, an origin and a destination. The level of security across a VPN is largely dependent on the type of encryption that is used to encapsulate the transmission. VPNs typically connect an ingress point to an egress point and are static and easily discoverable. As a result, it is possible for an adversary or interested party to detect the presence of a VPN link and obtain intelligence related to the existence of a link between the ingress point and the egress point even if the traffic itself remains encrypted. Moreover, to alter the topography of a traditional VPN (e.g., change the egress point), the existing link is "torn down" and a new VPN established. This process results in a break in traffic exchange, and the establishment of a new VPN can consume significant network overhead (e.g., relative to an established VPN) and take a significant amount of time (e.g., tens of seconds) to restore communications. A need therefore exists for dynamic VPN routing.

Known VPN techniques implemented across commercial networks (also referred to herein as "clouds") typically have static ingress and egress points and no or poor control of the route between the ingress point and the egress point. Moreover, users and/or administrators associated with the origin and/or destination compute devices have little or no control over the physical and/or virtual path the VPN tunnel takes across the cloud(s). The VPN tunnel itself can be logically (and in some cases physically) represented by a single point-to-point connection. In the event a VPN tunnel traverses multiple physical servers and/or switches, as may occur when a VPN is implemented using a commercial cloud provider, any intermediate hops within the cloud will typically be outside the control of the VPN provider and users and/or administrators associated with the origin and/or destination compute devices. Moreover, changing the egress point of a known VPN, whether implemented across a cloud or more traditional network infrastructure, typically requires tearing down the existing link and establishing a new VPN from the ingress point to the new egress point, disrupting communications between the origin and the destination.

Additionally, traffic sent across VPNs applying known network virtualization techniques or implemented in a cloud employing known network virtualization techniques will typically take an unpredictable and/or varied path through the physical and/or virtual infrastructure. As a result, known VPNs have inconsistent latencies as, for example, two packets traversing a VPN implemented across a virtual network may take different routes and may arrive out of order. A need therefore exists for customer-defined and/or predictable VPN routing.

Tor and/or onion routing, allows a user to surf the interne with some degree of anonymity by obfuscating the path between the origin and the destination. Tor generally operates through the use of Tor client software installed as a routing application, a Browser Plug-In, or a Tor specific browser. Tor clients and nodes maintain a list of participating Tor nodes in a routing table that is updated via network broadcasts. Tor clients then select a path between the origin and destination by randomly selecting multiple (typically at least three) routing nodes (an ingress node, one or more intermediate nodes, and an egress node) from the list. The Tor client encrypts each packet for each node, creating "layers" of encryption. In transit, each node will strip off one layer of encryption to discover the subsequent routing information and then forward on the encrypted package with one less layer without passing information about the prior node. The egress node is thus the last node in the Tor network to receive the packet and, after decrypting the last layer, the destination address is revealed. The egress node than passes the packet to the destination. Because each packet is encrypted, each node only knows the immediately prior and immediately subsequent node, so in instances in which at least three nodes are used, no one node has both the origination and destination information at the same time. Tor, however, does not allow a client or administrator to select a path through the Tor network. Moreover, Tor operates by broadcasting a node list so that each client and node remain up to date. As a result, an adversary, destination, and/or interested party can recognize the use of Tor by identifying the egress node as belonging to the Tor network. Additionally, like known VPNs, changing the exit node requires terminating the existing connection, selecting an all new set of nodes and renegotiating a connection to a new ingress node, which takes significant time and consumes significant network overhead. A need therefore exists for dynamic VPN routing that enables a user and/or administrator associated with the source device to select a path through the network and that does not broadcast the presence of the network (e.g., broadcasting information identifying the egress node as belonging to a VPN).

DETAILED DESCRIPTION

Figure 1:
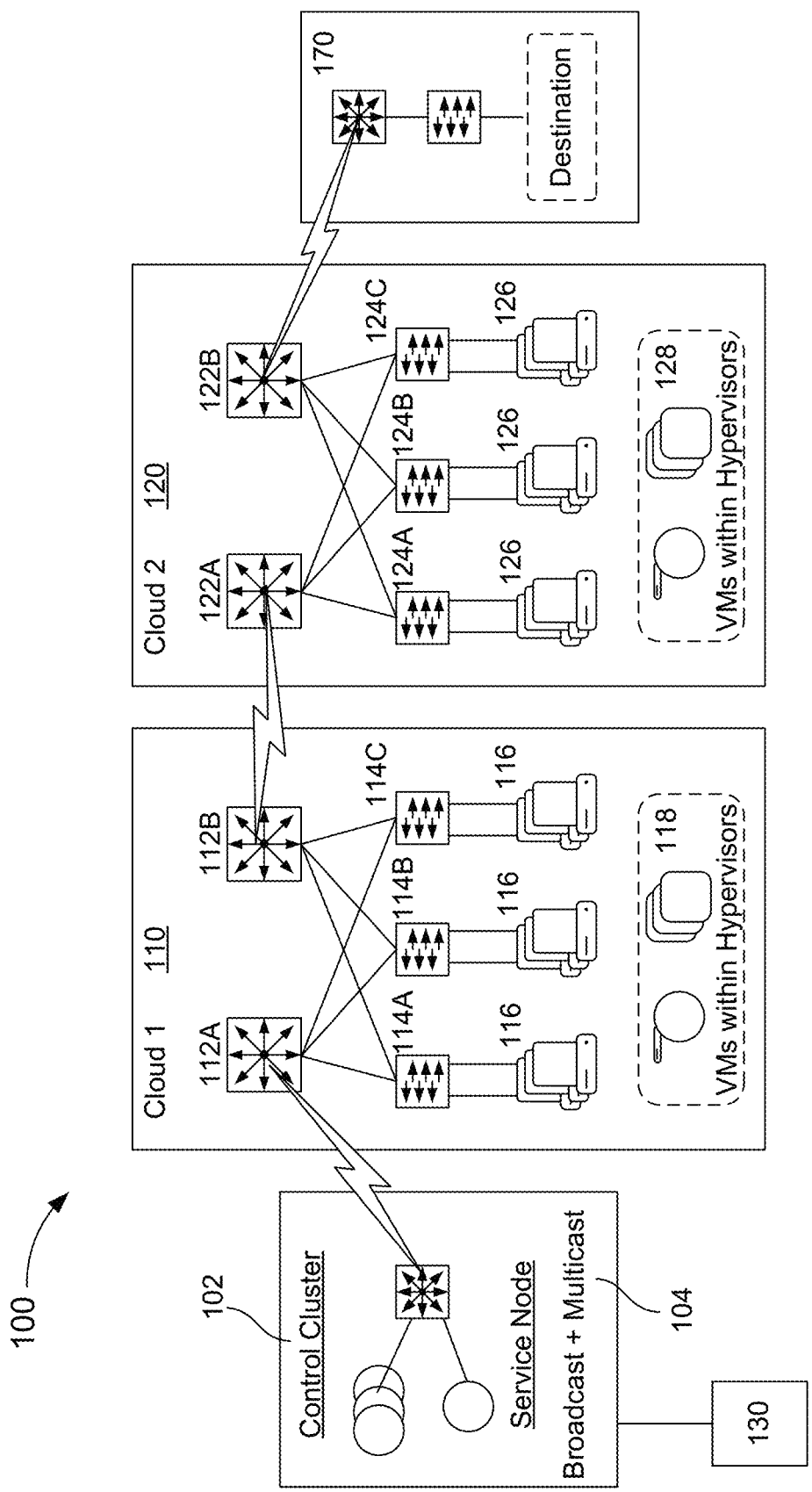
FIG. 1 is a physical schematic diagram of a VPN implementation or system, according to an embodiment.

Some embodiments described herein are suitable for providing cloud-based secure virtual private networks (VPNs) and identity-(persona-) protected access to the Internet. Some embodiments provide support for customer migration to the cloud, a range of identity management and persona attribution options, secure network connectivity, and/or control of customer information held within commercial cloud providers' databases. Some embodiments can distribute the communications activity, data storage, and work dynamically within and across multiple clouds simultaneously (collectively referred to as the network). Some embodiments can also provide a mix of cloud transport, application location, and data storage options. Some embodiments can be implemented to provide each customer with the ability to define its own dedicated network(s) within a service infrastructure. In addition, some embodiments can augment the multi-layered security capabilities provided by the commercial cloud providers with an additional layer of encryption and implementation of dynamic security policies that prohibit malicious traffic from entering the network. With such embodiments, companies can take advantage of all the benefits of cloud technology while improving the overall resiliency, security and exposure on the Internet.

In some embodiments, VPNs can be provided using commercial clouds for transport purposes, which can provide enhanced capabilities for customer access to the Internet, with a range of identity (persona) management options, geolocation sites, and control of the customer information held within commercial providers' databases. These embodiments can distribute the communications activity dynamically within and across multiple clouds simultaneously and regularly update the underlying physical and/or virtual network infrastructure. The dynamic transport of communications for Internet access across multiple commercial providers make actual user information and origination identities a very difficult target for hackers, search engine optimization companies, and other privacy threats. Some embodiments described herein rely on and/or employ virtualization techniques, the use of software such as hypervisors that are operable to define and/or instantiate abstract virtual machines and/or virtual switches irrespective of the underlying hardware, which may be distributed across commercial clouds and/or private networks. To efficiently manage the complexity of establishing and maintaining virtual networks described herein, any suitable virtualization platform, for example VMware's network virtualization suite, can be used.

A virtualization platform can be configured such that data traffic to/from external network endpoints can be handled by virtual devices (hypervisors, gateways, and service nodes). For example, a hypervisor in one data center can tunnel packets to another hypervisor in a different data center, which can provide OSI model Layer 2 (L2) connectivity between two physical and/or virtual machines (VMs) that are on the same logical network. For another example, a hypervisor can tunnel a packet to a service node, which can encapsulate that packet and forward it using a secure VPN tunnel to a gateway in a remote customer premises.

A virtualization platform can manage and/or otherwise control the path that data takes through a one or more clouds. Said another way, the virtualization platform can define a network layout and can therefore control the path data takes through the defined network layout. For example, an Open vSwitch (OVS) management connection can use Secure Sockets Layer (SSL) for security and can provide a controller cluster module (e.g., associated with origin and/or destination compute device and/or network) with a user interface that allows a user and/or administrator associated with the origin and/or destination to: (1) view the set of endpoints (VMs or external networks) present on a given OVS device; (2) distribute the logical-network forwarding state to the OVS devices; and (3) manipulate OVS packet forwarding to implement the logical-network view.

As discussed above the virtualization platform can be used to define one or more networks included in a system. A network defined by the virtualization platform can include a transport network view and a logical network view.

Some embodiments described herein relate to a computer implemented method of managing communications between an origin and a destination using an end-user and/or administrator configurable virtual private network(s) (VPN(s)). The method can include receiving data (e.g., packets) from the origin that identify the destination. For example, packets received from the origin can include a public or private internet protocol (IP) address associated with the destination. A first VPN that includes a first ingress node and a first egress node can be defined at a first time. The first ingress node and the first egress node can each be physical and/or virtual network switches. The first ingress node can be communicatively coupled to the origin, and the first egress node can be communicatively coupled to the destination. Each packet that identifies the destination and is received during a first time period can be sent from the origin to first ingress node, across the first VPN to the first egress node, and on to the destination via a first data path that includes multiple logical switches, including the first ingress node and the first egress node. A second VPN between a second ingress node and a second egress node can defined at a second time. The second ingress node can be communicatively coupled to the origin, and the second egress node can be communicatively coupled to the destination. Each packet that identifies the destination and is received during a second time period can be sent from the origin, to the second ingress node, across the second VPN to the second egress node, and on to the destination. Each packet sent across the first VPN and each packet sent across the second VPN can follow the same data path associated with that respective VPN. In this way, each packet can arrive at the first egress node in the order it was received at the first ingress node. Similarly, each packet can arrive at the second egress node in the order it was received at the second ingress node. In this way, the transition between the first VPN and the second VPN can be "seamless" (e.g., without data packets being lost or dropped), and communications between the origin and the destination are not disrupted between the first time period and the second time period (e.g., without needing to reestablish a new connection between the origin and the destination).

Some embodiments described herein relate to a computer implemented method of providing end-to-end encryption over a VPN that spans at least one commercial cloud. Multiple logical switches in a commercial cloud can be instantiated. For example, a controller can send a signal to cause the logical switches to be instantiated. Multiple different decryption keys can be defined and a decryption key can be sent to each logical switch such that each logical switch is uniquely associated with a different decryption key. A VPN can be defined that includes at least a subset of the logical switches. A packet can be received from an origin. Multiple layers of encryption can be applied to the packet. Each layer of encryption can be applied using a different encryption key that is associated with a decryption key sent to one of the logical switches. Each layer of encryption can encrypt an address of the next logical switch along the route such that only a logical switch possessing the corresponding decryption key can read the address of the next logical switch.

FIG. 1 is a schematic diagram of a VPN implementation or system 100 according to an embodiment. Specifically, FIG. 1 depicts a physical view of system 100. System 100 can include the architecture of the network (e.g., the core level, the aggregation level, the server level, etc.) that can provide access to a destination 170 across, for example, two commercial clouds. As shown in FIG. 1, system 100 can include a control cluster module 102, a service node module 104, a first cloud 110, a second cloud 120, and a customer module 130. While shown in FIG. 1 as including two commercial clouds, in other embodiments, the system can include any number of commercial clouds and/or private networks. In some embodiments, control cluster module 102 and/or service module 104 can be installed and/or otherwise distributed across one or more compute devices, (e.g., server) in a data center (not shown). In some embodiments, the data center can be the same or different from a data center hosting cloud 110 and/or cloud 120. Customer module 130 can be used to manage system 100, for example, manage the specific aspects of system 100 that are associated with a particular customer (user).

As shown in FIG. 1, cloud 110 can include one or more core modules (or switches) 112A, 112B and one or more aggregation module (or switches) 114A-114C. Similarly, cloud 120 can include one or more core modules 122A, 122B and one or more aggregation module 124A-124C. While cloud 110 and cloud 120 are shown in FIG. 1 as including two core modules and three aggregation modules each, in other embodiments either of cloud 110 and/or cloud 120 can include more or fewer core and/or aggregation modules.

In some embodiments, a virtualization platform can be installed on one or more physical servers 116, 126 within cloud 110 and/or cloud 120. In such embodiments, the virtualization platform can be used to instantiate multiple virtual machines 118, 128. In some embodiments, a hypervisor transport node module can be installed to facilitate the data transport within each cloud. A hypervisor transport node module can include a hypervisor and OVS. In such embodiments, at least a portion of the multiple virtual machines 118, 128 can be operatively coupled to the hypervisor to facilitate system 100 communications. In such embodiments, routing instructions for system 100 can be installed on each of the multiple virtual machines 118, 128.

The system 100 can be used for routing between the logical networks, and can allow for transport between cloud 110 and/or cloud 120 and the Internet. Similarly stated, the destination 170 can be any computing entity accessible via the Internet. In some embodiments, physical connectivity between the hypervisor transport node module and gateway transport node module can be via internal IP addresses assigned by the control cluster 102, cloud 110, and/or cloud 120.

In some instances, control cluster module 102, also referred to herein as network layout module, can manage hypervisor transport node modules and gateway transport node modules. In such instances, when a new hypervisor transport node module and/or a gateway transport node module are instantiated, control cluster 102 can be notified to begin managing the respective module. Alternatively, control cluster 102 can be operable to send a signal to cloud 110 and/or cloud 120 to cause new hypervisor transport node module(s) and/or a gateway transport node module(s) to be instantiated within that respective cloud.

Transport node modules (e.g., hypervisor transport node module and/or a gateway transport node module) can communicate with each other to implement logical networks. Transport connectors (not shown in FIG. 1) can define an encapsulation mechanism and identifiers used for those connections.

Figure 2:
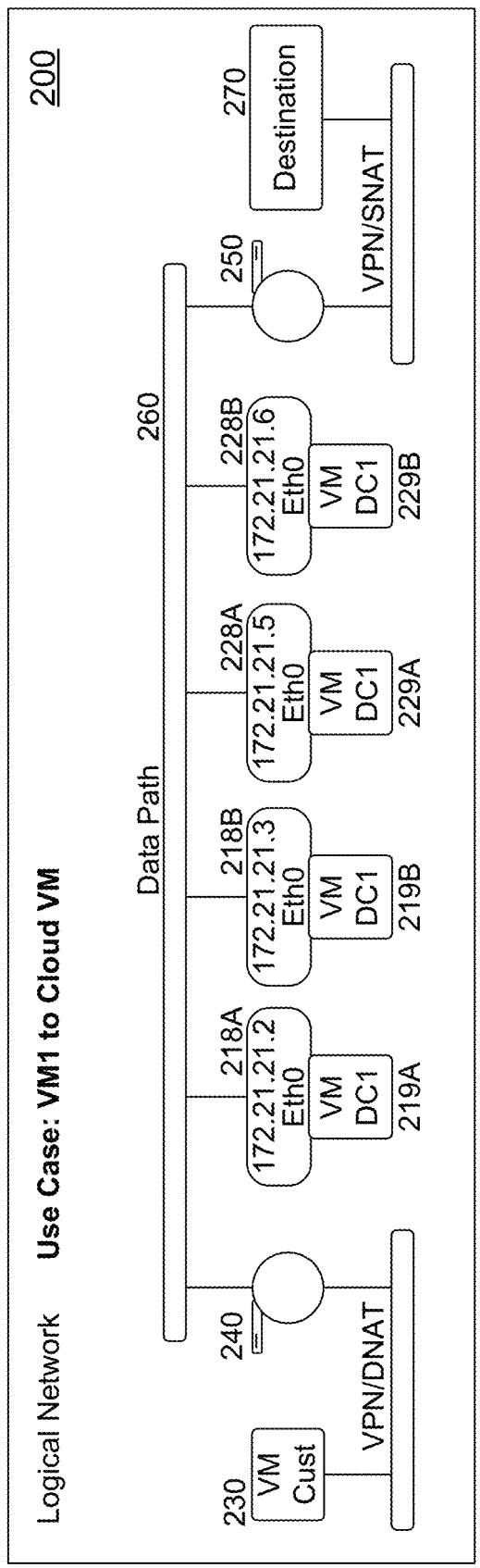
FIG. 2 is a logical schematic diagram of a VPN implementation or system, according to an embodiment.

FIG. 2 is a schematic diagram of the system 200 according to an embodiment. Specifically, FIG. 2 depicts a logical network view of system 200. System 200 can be similar to and include similar elements as system 100, and can be used to connect a user 230 (e.g., an origin) to a destination 270. System 200 includes a customer module 230, an ingress node (or gateway transport node module) 240, an egress node (or gateway transport node module) 250, and hypervisor transport node modules 218A, 218B, 228A, 228B. The hypervisor transport node modules 218A, 218B, 228A, 228B can each be virtual machines and/or logical switches. Collectively, the hypervisor transport node modules 218A, 218B, 228A, 228B define a data path 260 across a VPN. In some embodiments, some hypervisor transport node modules can be instantiated in a first cloud (not shown in FIG. 2) and some hypervisor transport node modules can be instantiated in a second cloud (not shown in FIG. 2). Gateway transport node module 240, gateway transport node module 250, and hypervisor transport node modules 218A, 218B, 228A, 228B communicate with each other to implement the logical network of system 200. In some embodiments, the virtualization platform instantiates and/or otherwise uses logical switches (e.g. hypervisor transport node modules 218A, 218B, 228A, 228B) and logical ports (not shown in FIG. 2) to represent connectivity and port configuration within the logical view. Virtual machines 219A, 219B, 229A, 229B interface with external physical networks via logical ports.

In some embodiments, OVSs can expose/bridge each of virtual machines 219A, 219B, 229A, 229B to the hypervisor's physical network interface. In some embodiments, each logical port can include an attachment that can act as a source/sink of traffic sent in and out of the logical network. In some embodiments, virtual machines 219A, 219B, 229A, 229B can use a virtual interface (Vif) Attachment such that communications across the entire network are identified as being associated with one logical switch. This attachment can allow the virtual machines 219A, 219B, 229A, 229B to move data from one port to another across the network. Each of virtual machines 219A, 219B, 229A, 229B can include routing instructions to facilitate communication through the logical network of system 200. In some embodiments, gateway transport node modules 240, 250 can use an OSI model layer 3 (L3) gateway attachment that can allow a connection of a logical switch port to a physical network interface exposed via a virtualization platform gateway service (e.g., a node configured to allow communications between networks using the same and/or different protocols).

Figure 3:
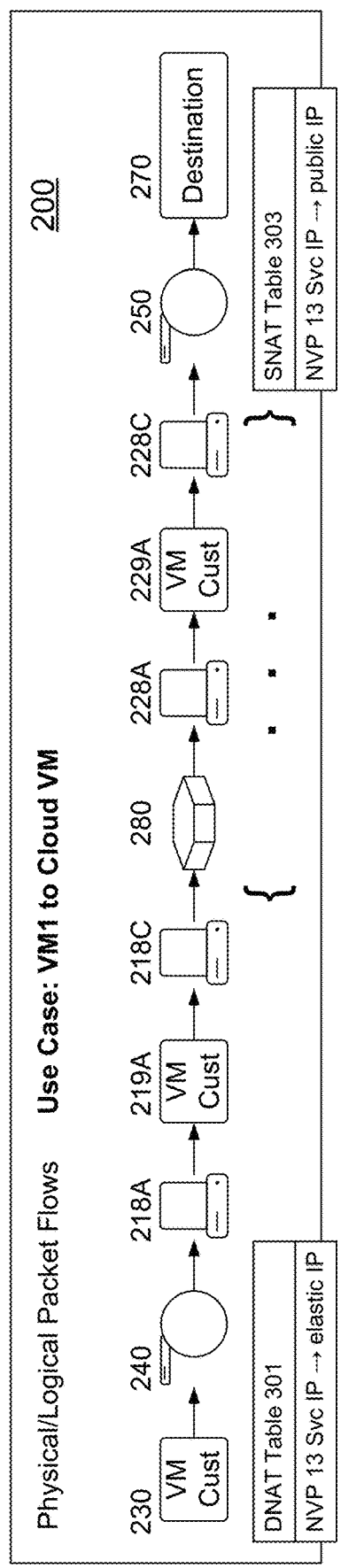
FIG. 3 is a logical-physical schematic diagram of a VPN implementation or system, according to an embodiment.

FIG. 3 is a schematic diagram of the flow of a packet through system 200 according to an embodiment. Specifically, FIG. 3 depicts a logical-physical view of a packet flowing through system 200. With reference to FIG. 2, a user can initiate transmission of data that includes a packet at customer module (or origin) 230. The packet can be sent to gateway transport node module (or ingress node) 240, and can be switched by an OVS associated with hypervisor transport node module 218A, using a routing table, to virtual machine 219A. When the packet first enters the system 200, one or more Destination Network Address Translation (DNAT) table(s) 301 can be used to map an external address, e.g., public IP address to an internal address, e.g., private IP address. In some embodiments, when a packet enters system 200, gateway transport node module 240 can append an internal IP address to the packet based on its external IP address. In such embodiments, the internal IP address can be used, in conjunction with the routing table(s), to route the packet through system 200. Next, the packet can be switched by an OVS associated with a hypervisor transport node module 218C, using a routing table, to a physical interface 280 between the first cloud and the second cloud. The packet can then be switched by an OVS associated with hypervisor transport node module 228A, using a routing table, to virtual machine 229A. Next, the packet can be switched by an OVS associated with a hypervisor transport node module 228C, using a routing table, to gateway transport node module (or egress node) 250 and out of system 200 to destination 270. Before the packet first exits the system 200, one or more Source Network Address Translation (SNAT) table(s) 303 can be used to map an internal IP address to an external IP address. In some embodiments, when a packet enters system 200, gateway transport module 250 can append the external IP address to the packet based on its internal IP address. In such embodiments, the external IP address can be used to route the packet to its final destination outside of system 200.

As described herein, the path a packet takes through system 200 can be defined by a user and/or administrator associated with an origin compute device (e.g., customer module 230), an administrator of the VPN service provider, and/or destination compute device (e.g., destination 270). The path can be dynamically changed based on a perceived threat, on a predetermined schedule, etc. In such instances, the path can travel between any number of virtual machines across any number of clouds. In some such instances, the path can include a first virtual machine in a first cloud, then a first virtual machine in a second cloud, then back to a second virtual machine in the first cloud, then back to a second virtual machine in the second cloud. In such instances, the routing tables can be updated to ensure proper routing within the network for legitimate traffic. In some instances, because the path changes, an intruder seeking to discern the location of a client website and/or otherwise uncover a source of a packet would be unable to trace the packet via the original path, because that path may change.

Figure 4:
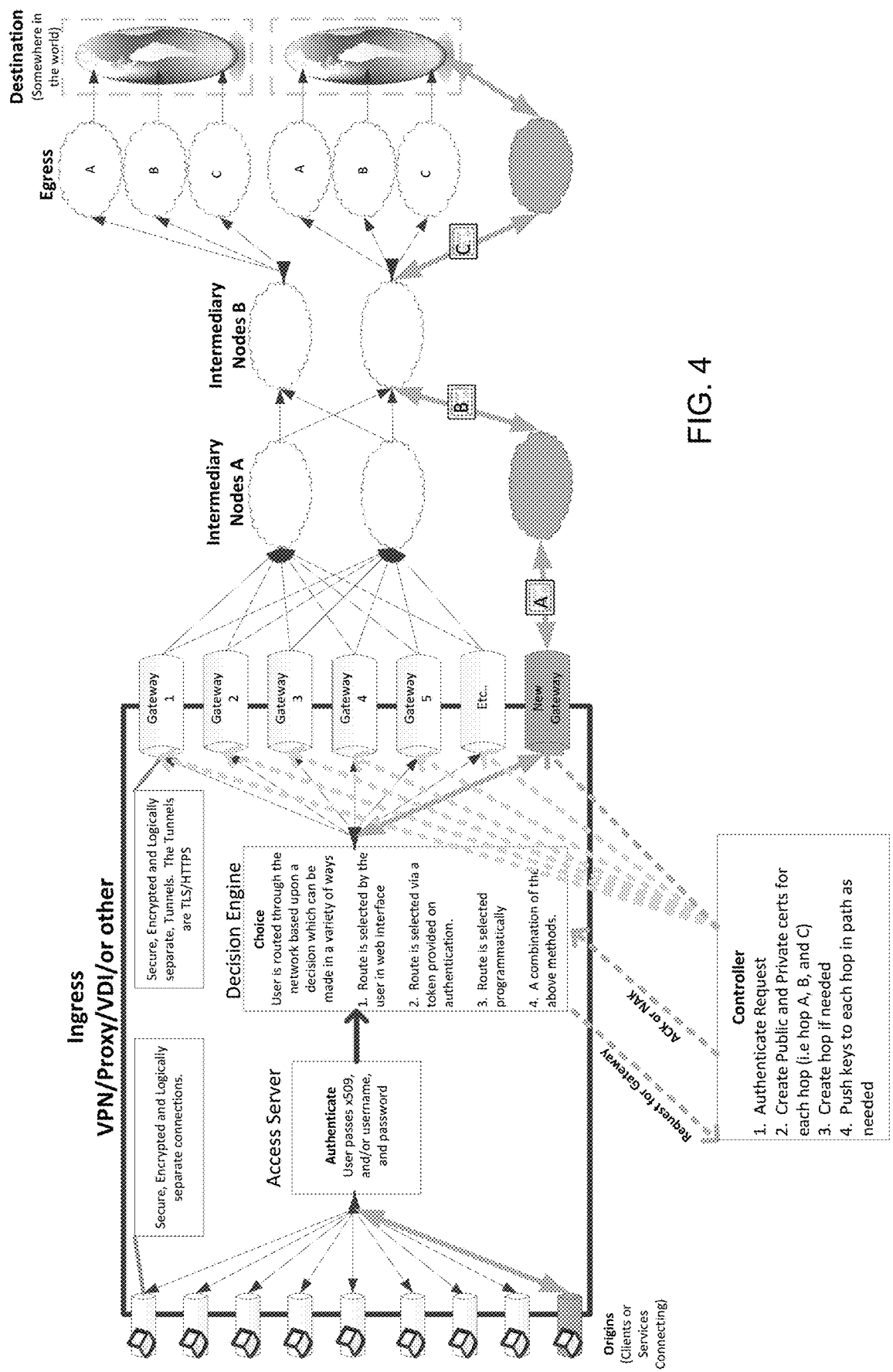
FIGS. 4 and 5 are schematic illustrations of a system for flexible and dynamic VPN routing, according to an embodiment.
Figure 5:
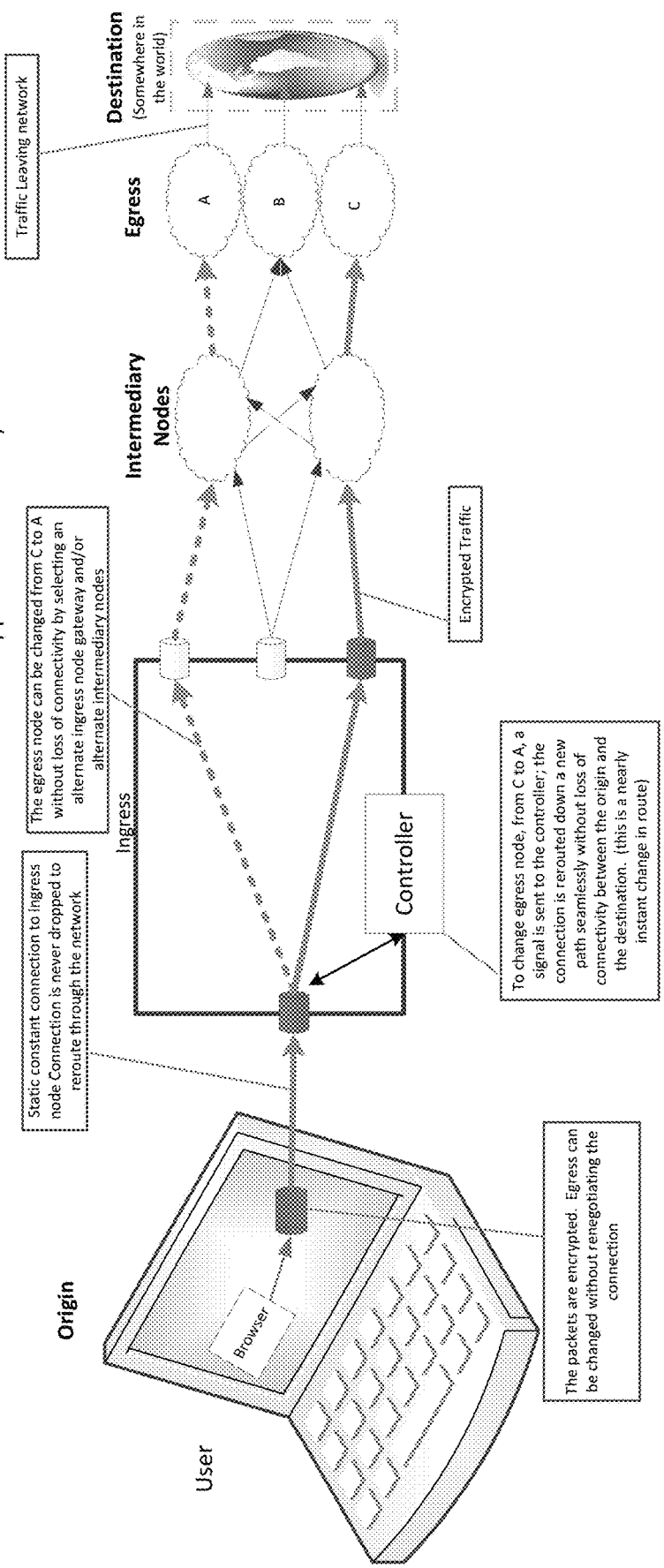
Figure 6:
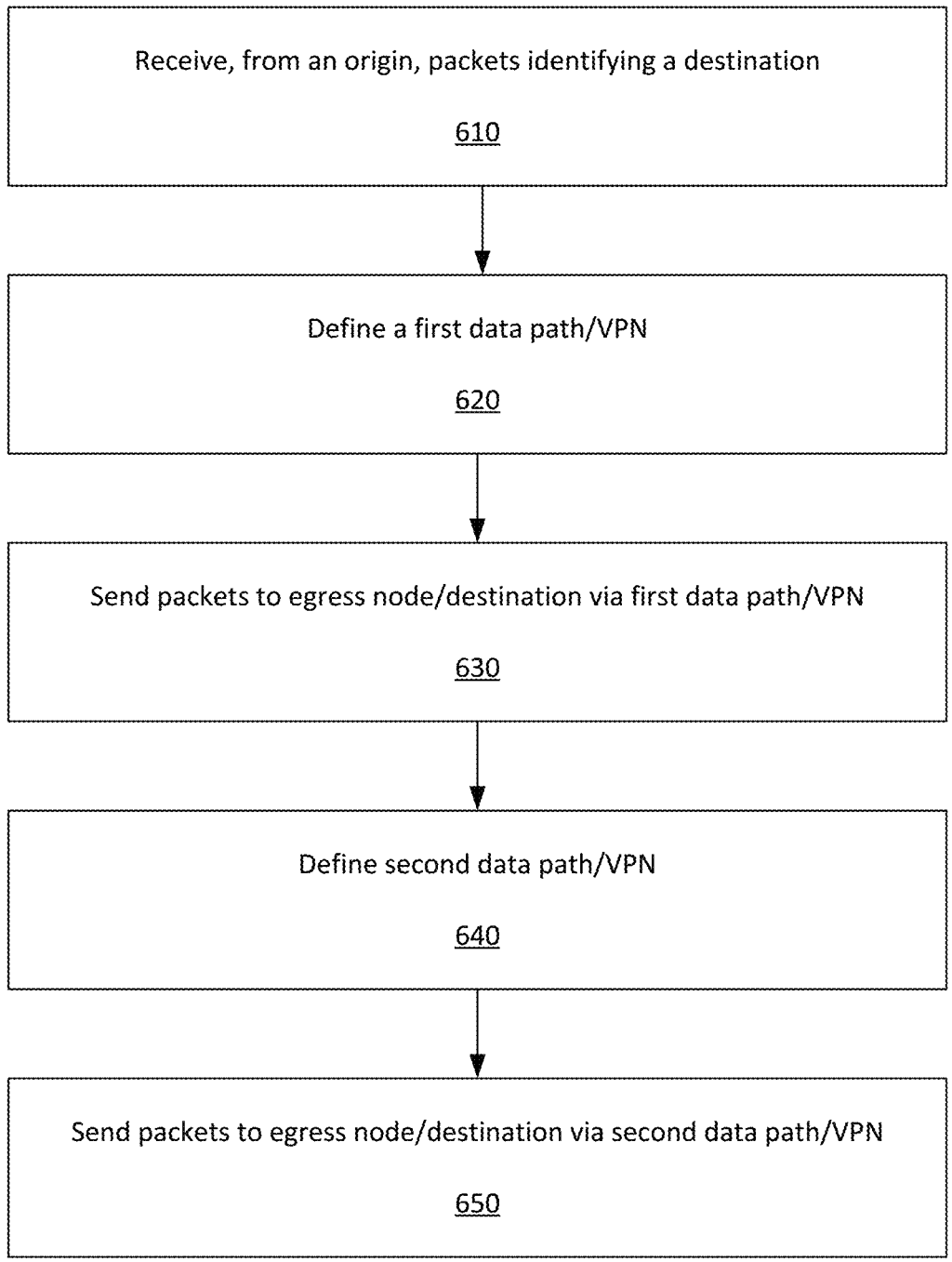
FIG. 6 is a flow chart of a method of providing flexible and dynamic VPN routing, according to an embodiment.

FIGS. 4 and 5 are schematic illustrations of a system for flexible and dynamic VPN routing, according to an embodiment. The system includes a decision engine that can be operable to define a route through one or more gateways, nodes, hypervisors and/or clouds. As shown in FIGS. 4 and 5, the decision engine can be hardware and/or software (stored in memory and/or executing on a processor) associated with an ingress node, which can be structurally and/or functionally similar to the ingress node 240 as shown and described above. In other embodiments, the decision engine can be associated with a controller that is logically and/or physically distinct from an ingress node. FIG. 6 is a flow chart of a method that can be implemented using the systems of FIGS. 4 and 5, according to an embodiment.

As discussed above, known VPNs consist of a static tunnel and/or, if implemented in the cloud, typically do not control or define each hop (i.e., intermediate nodes) along the route. As a consequence, different packets may travel different paths and have different latencies, potentially arriving out-of-order. Additionally, with known VPNs, traffic from a source is decrypted at an ingress node and routed thorough the network to the egress node where it is re-encrypted, possibly with additional node-to-node encryption. Such an encryption scheme, however, presents a vulnerability to man-in-the-middle attacks, for example in the event that a software defined network used for the VPN, the VPN provider, or one of the nodes is compromised.

As shown in FIGS. 4, 5, and 6 clients or origins (e.g., compute devices having a processor and/or memory) can connect to an ingress node (e.g., a VPN, Proxy, Virtual Desktop Infrastructure (VDI), etc.). The ingress node can receive data (e.g., packets) that identify a destination, at 610. The ingress node and/or an access server (a physical and/or virtual compute device) can authenticate traffic and/or the client. For example, upon connecting to an ingress node, the access server (hardware and/or software executing on a physical or virtualized processor) may request a username and password, the client can pass an x.509 public key infrastructure (PKI) certificate to the access server, or the client (origin) or traffic can be authenticated by any other suitable means. The access server can send authenticated traffic received from the client (origin) to a decision engine (hardware and/or software executing on a physical or virtualized processor).

In some embodiments each of the controller and the decision engine can operable to control, define, and/or reconfigure a route that may span multiple physical and/or virtual devices. In some embodiments, the controller and the decision engine can be physically and/or logically co-located (e.g., at the ingress node and/or authentication server). In other embodiments, the controller and the decision engine can perform different functions and/or may be physically and/or logically separate devices. For example, in some embodiments the controller can be operable to authenticate data and/or users, instantiate nodes (e.g., send signals to cause nodes to be instantiated), and define encryption and/or decryption keys (as discussed in further detail herein), while the decision engine can be operable to define a route across nodes that the controller caused to be instantiated. It should be understood, however, that descriptions of the controller and/or functions performed by the controller can apply to the decision engine and vice versa.

The decision engine can send a request for a gateway to the controller. The controller can authenticate the request and send, to the decision engine, an acknowledgment (ACK) if the authentication is successful, or negative acknowledgement (NAK) if the authentication fails. If the authentication is successful, the controller can allow the user (or an administrator) define a particular route that specifies each node in the path, for example based on an authentication token defined and/or provided by the access server.

The decision engine can be operable to instantiate virtual switches in one or more clouds and/or define a data path from the ingress node to an egress node and the destination, at 620. Similarly stated, the decision engine can send signals to one or more clouds to cause an ingress node, an egress node and/or one or more intermediate nodes to be instantiated. The decision engine can define a VPN at 620, including selecting an egress node and selecting one or more intermediate nodes. In some instances, the decision engine can define the route based on instructions received from the origin or destination (e.g., a user associated with the origin can be presented a webpage allowing the user to select the route including egress nodes and/or intermediary nodes). For example, the decision engine can define a routing table that specifies each node data will traverse between an ingress node and an egress node. The decision engine can also be operable to propagate at least a portion of the routing table to each node. In other instances, the route can be selected via a token provided on authentication. For example, a user and/or administrator associated with the origin (and optionally not associated with a commercial cloud that the route traverses) can specify all or part of a route via a token provided to the decision engine or in a format accepted by the decision engine. In another instance, the route can be selected completely or partially programmatically or any suitable route specifying/selecting mechanism or a combination of mechanisms can be used.

Defining the entire route can assure that each packet travels the same path and arrives at the egress node and/or destination in the order in which it was sent by the origin and/or received by the ingress node (with allowances for the occasional dropped/resent packet) at 630. Because the packets each take the same path, reconfiguring the route, including changing the ingress node and/or egress node, can be accomplished with minimal service disruption even, for example, during live streaming. For example, from the perspective of destination, changing the egress node of the VPN can appear similar to a smart phone changing IP addresses when the smartphone connects to different towers and/or cellular networks. In some embodiments, unlike known static VPN tunnels, the path can be automatically rerouted based on event data received by the controller, such as network status monitoring, indications of network interruptions, network congestion, or network latency.

The controller (hardware and/or software executing on a physical or virtualized processor) shown in FIGS. 4 and 5 and communicatively coupled to the decision engine is operable to control, define, and/or reconfigure a route that may span multiple physical and/or virtual devices. At 640, the controller can define a second VPN and/or data path between the origin and the destination. For example, the controller can modify a routing table defined by the decision engine at 620 or create an entirely new routing table. The second VPN and/or data path can include a different ingress node, one or more different intermediate nodes, and/or a different egress node than the first VPN and/or data path. In some embodiments, defining a second VPN and/or data path can include instantiating logical switches (e.g., sending signals to a cloud to cause logical switches to be instantiated). At 650, packets sent from the origin can be routed to the destination via the second VPN. Similarly stated, during a first time period, packets sent from the origin to the destination can be routed via the first VPN, defined at 620, and during a second, mutually exclusive time period, packets sent from the origin to the destination can be routed via the second VPN, defined at 640. As discussed in further detail herein, the transition from the first VPN to the second VPN can be seamless and may not require interrupting communications between the origin and the destination, including, for example, not interrupting streaming video or music.

Figure 7:
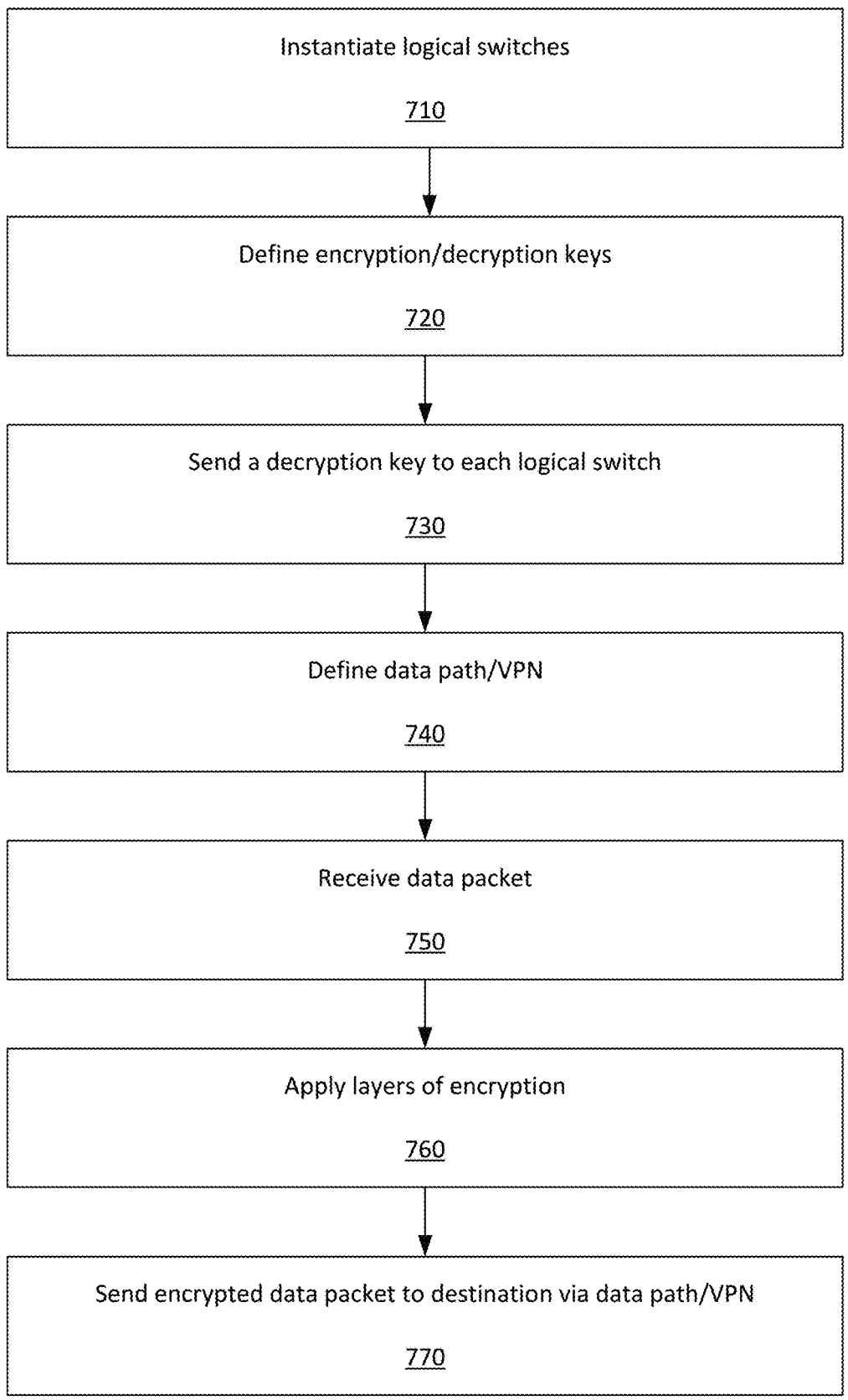
FIG. 7 is a flow chart of a method of providing end-to-end encryption across a VPN that spans at least one commercial cloud, according to an embodiment.

FIG. 7 is a flow chart of a method of providing end-to-end encryption across a VPN that spans at least one commercial cloud, according to an embodiment. The controller can be operable to define nodes (e.g., instantiate hypervisors, VMs, and/or OVSs) at 710. Defining nodes can include the controller sending a signal(s) to cause nodes to be instantiated when the signal(s) are received by hardware and/or clouds on which the nodes are to be instantied.

The controller can be operable to define public and/or private certificates (e.g., for public key encryption) for each node along the route, at 720, and/or push decryption certificates to each node, at 730, such that each node has a different decryption key. As discussed above, in other embodiments, the decision engine can be operable to define public and/or private certificates and/or push encryption certificates to each node. In some embodiments, the controller can be physically and/or logically co-located the decision engine and/or the ingress node. In other embodiments, the controller can separated from controller and/or the ingress node. Separating the controller from the ingress node may avoid exposing the controller to general interne traffic (e.g., clients, origins, and/or compute devices posing as clients), which can present an additional layer of security in the event an adversary seeks to attack or discover information about certificates defined by the controller. In other embodiments, an end user (e.g., the origin) can define decryption certificates for each node and/or push decryption certificates to each node.

The controller and/or the decision engine can define a VPN and/or data path through one or more private and/or public networks, at 740, for example by defining a routing table that includes at least some of the nodes defined above at 710. The data path and/or VPN can include at least a subset of the nodes instantiated at 710. A packet can be received that was sent from an origin and addressed or otherwise intended for a destination, at 750. The packet can be encrypted, at 760, using the private certificates or a public certificate corresponding to the private certificate defined for each node at 720 that is along the data path defined at 740. Each layer of encryption can obscure the address for the next node along the data path. At 770, the encrypted packet can then be sent to the destination via the data path and/or VPN defined at 740. In this way, the packet need not be fully decrypted at each node to identify a destination and/or next node, reducing or eliminating the opportunity for man-in-the-middle vulnerabilities. In some embodiments this can include onion-like layered encryption. Thus, when a node receives a packet, it can decrypt one layer of encryption with the private certificate uniquely associated with that node, revealing an address of the next node along the data path, but not revealing the contents of the packet or addresses beyond the next node. Similarly stated, when a node decrypts a packet using its private decryption key, it can reveal the address of the next node, but the address(es) of subsequent nodes, the egress node, and/or the destination may remain obscured by subsequent layers of encryption. In some such instances, the address of the next node along the data path can be represented by a private or internal IP address particular to the VPN as discussed above with reference to FIG. 3, rather than a public IP address. In such an embodiment, the controller can be operable to define a private routing table for the VPN and address each layer of the encrypted packet with a private IP address.

Additionally, spanning multiple nodes as opposed to the use of a static VPN tunnel, can allow the source of data to be hidden from intermediate nodes, complicating traffic analysis techniques and improving user privacy. Encrypting the data at the controller and not decrypting data at intermediate nodes can further improve user privacy. Any suitable secure communication protocol, such as hypertext transfer protocol (HTTP) over transport layer security (TLS) (HTTPS) can be used.

Unlike Tor, the controller and/or the decision engine may not rely on publicly-known and/or pre-existing nodes. Furthermore, the controller and/or nodes may not broadcast or otherwise transmit a routing table and/or list of available nodes. Through the use of a private node list and/or instantiating nodes on an as-needed or regular basis, egress nodes may not be identifiable as being associated with a VPN or any particular source.

In addition, by controlling the route of the traffic from the ingress to egress, the controller and the decision engine can be operable to dynamically reroute traffic, without breaking a connection to the destination. Compared to known VPN techniques where changing the egress node requires renegotiating a connection between the ingress and egress nodes, which will typically cause a TCP/IP or other connection to time out, by controlling the route from ingress node to egress node, embodiments described herein can be operable to change egress nodes without interrupting the connection. Similarly stated, the controller can establish, instantiate, and/or maintain nodes, VMs, and/or hypervisors so that network connections (virtual local area networks, proxies, etc.) stay up while rerouting data to the destination. Additionally controlling the routing such that each packet transits the VPN via the same route (until a route is manually and/or dynamically changed) packets will arrive in the same order, which reduces delays and prevents or inhibits network connections from timing out when an egress node or any other node is changed.

Some embodiments described herein relate to physical and/or virtualized compute devices, such as clients/origins, access servers, nodes, etc. It should be understood that each compute device can include a processor and a memory. Alternatively, in the case of virtualized compute devices or switches, the compute devices can be logically equivalent to a physical device with one or more discrete processors and memories, but may be software based/defined abstractions from the underlying physical hardware. Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory processor-readable medium storing code to be executed by a processor, the code comprising code representing instructions to:
   receive a first data packet from an origin at a first time, the first data packet received at a first logical switch from a plurality of logical switches, the first logical switch instantiated in a first commercial cloud, the first data packet being from a stream of packets;
   send the first data packet to a second logical switch from the plurality of logical switches based on a first internal IP address included with the first data packet that specifies at least a portion of a route of a first virtual private network (VPN) to a first egress node, the second logical switch instantiated in a second commercial cloud at least partially physically distinct from the first commercial cloud;
   receive, at the first logical switch, a second packet from the stream of packets at a second time after the first time, the stream of packets being continuous from the first time to the second time; and
   send the second data packet to a third logical switch from the plurality of logical switches without interrupting continuity of stream of packets traveling from the origin to a destination, the second data packet sent to the third logical switch based on a second internal IP address specifying a route of a second VPN to a second egress node, the route of the second VPN being at least partially different from the route of the first VPN.

2. The non-transitory processor-readable medium of claim 1, wherein the first data packet is received from the origin via an ingress node.

3. The non-transitory processor-readable medium of claim 1, wherein the first logical switch is an ingress node of the first VPN.

4. The non-transitory processor-readable medium of claim 1, wherein the first egress node is the same as the second egress node.

5. The non-transitory processor-readable medium of claim 1, wherein the first egress node is different from the second egress node.

6. The non-transitory processor-readable medium of claim 1, wherein the first egress node is from the second commercial cloud.

7. The non-transitory processor-readable medium of claim 1, wherein the first egress node is from a third commercial cloud at least partially physically distinct from the first commercial cloud and the second commercial cloud.

8. The non-transitory processor-readable medium of claim 1, wherein each logical switch from the plurality of logical switches does not broadcast encryption keys, decryption keys, their membership in the first VPN, or their membership in the second VPN.

9. The non-transitory processor-readable medium of claim 1, further comprising code representing instructions to:

receive, from the origin, a certificate authenticating an origin device, the route of the first VPN defined based on the certificate.

10. The non-transitory processor-readable medium of claim 1, further comprising representing instructions to:
receive, from the origin, a first certificate, the route of the first VPN defined based on the first certificate; and
receive, from the origin, a second certificate, the route of the second VPN defined based on the second certificate.

11. The non-transitory processor-readable medium of claim 1, wherein the route of the first VPN includes at least three logical switches from the plurality of logical switches.

12. The non-transitory processor-readable medium of claim 1, wherein an administrator of the first VPN is not an administrator of physical hardware of the first commercial cloud or the second commercial cloud.

13. The non-transitory processor-readable medium of claim 1, wherein instructions to send the second packet to the destination via the second VPN includes instructions to send the second packet to the destination without any identifiers associated with the origin or any logical switch from the plurality of logical switches.

14. A non-transitory processor-readable medium storing code to be executed by a processor, the code comprising code representing instructions to:
define a first virtual private network (VPN) having a first route during a first time period that includes a first plurality of logical switches, each logical switch from the first plurality of logical switches uniquely associated with a different decryption key;
receive a first packet at a first logical switch from the first plurality of logical switches during the first time period, the first packet being from a continuous stream of packets;
apply, at the first logical switch, a first decryption key from a plurality of decryption keys to reveal an address of a second logical switch from the first plurality of logical switches;
define a second VPN having a second route during a second time period that includes a second plurality of logical switches, each logical switch from the second plurality of logical switches uniquely associated with a different decryption key;
receive a second packet at a third logical switch from the second plurality of logical switches during the second time period, the second packet being from the continuous stream of packets; and
apply, at the third logical switch, a second decryption key from the plurality of decryption keys to reveal an address of a fourth logical switch from the second plurality of logical switches, the fourth logical switch being different from the second logical switch, the continuous stream of packets being uninterrupted between the first time period and the second time period.

15. The non-transitory processor-readable medium of claim 14, wherein the first logical switch and the second logical switch are instantiated in different commercial clouds.

16. The non-transitory processor-readable medium of claim 14, wherein the second logical switch and the fourth logical switch are instantiated in different commercial clouds.

17. The non-transitory processor-readable medium of claim 14, wherein the first VPN and the second VPN have a same ingress node.

18. The non-transitory processor-readable medium of claim 14, wherein the first VPN has a first egress node that is different from a second egress node of the second VPN.

19. The non-transitory processor-readable medium of claim 14, the code further comprising code representing instructions to:
apply a plurality of layers of encryption on the first data packet, each layer of encryption from the plurality of layers of encryption applied using an encryption key associated with a decryption key from the plurality of decryption keys, that decryption key being associated with a logical switch from the first plurality of logical switches.

20. The non-transitory processor-readable medium of claim 14, wherein no logical switch from the first plurality of logical switches broadcasts any key associated with the decryption key from the plurality of decryption keys.

* * * * *